(12) United States Patent
Bestgen et al.

(10) Patent No.: US 9,403,409 B2
(45) Date of Patent: Aug. 2, 2016

(54) TIRE FOR A TWO-WHEELED VEHICLE, COMPRISING A TREAD HAVING SIPES

(75) Inventors: Luc Bestgen, Chatel-Guyon (FR); Bruno Gras, La Roche Blanche (FR)

(73) Assignees: COMPAGNIE GENERALE DES ETABLISSEMENTS MICHELIN, Clermont-Ferrand (FR); Michelin Recherche et Technique S.A., Granges-Paccot (CH)

( * ) Notice: Subject to any disclaimer, the term of this patent is extended or adjusted under 35 U.S.C. 154(b) by 628 days.

(21) Appl. No.: 13/578,808

(22) PCT Filed: Feb. 4, 2011

(86) PCT No.: PCT/EP2011/051632
§ 371 (c)(1),
(2), (4) Date: Oct. 23, 2012

(87) PCT Pub. No.: WO2011/098401
PCT Pub. Date: Aug. 18, 2011

(65) Prior Publication Data
US 2013/0186534 A1    Jul. 25, 2013

(30) Foreign Application Priority Data
Feb. 12, 2010 (FR) .................................... 10 50989

(51) Int. Cl.
*B60C 11/12* (2006.01)
*B60C 11/00* (2006.01)
(Continued)

(52) U.S. Cl.
CPC ............ *B60C 11/12* (2013.01); *B60C 11/0306* (2013.04); *B60C 11/124* (2013.04);
(Continued)

(58) Field of Classification Search
CPC ............... B60C 2011/0379; B60C 2011/0374; B60C 11/124; B60C 11/1222; B60C 11/1263; B60C 11/1315

USPC ........ 152/209.23, 209.18, DIG. 3, 209.5, 526
See application file for complete search history.

(56) References Cited

U.S. PATENT DOCUMENTS 4,140,168 A * 2/1979 Caretta ......................... 152/527
4,298,046 A * 11/1981 Herbelleau ............. B60C 11/12
152/209.23
(Continued)

FOREIGN PATENT DOCUMENTS

| CH | 561 615 | 5/1975 |
|---|---|---|
| CN | 1675077 | 9/2005 |

(Continued)

OTHER PUBLICATIONS

Machine Translation: JP 2000255218 A; Ishiyama, Makoto; no date.*

(Continued)

*Primary Examiner* — Steven D Maki
*Assistant Examiner* — Kendra Ly
(74) *Attorney, Agent, or Firm* — Cozen O'Connor

(57) ABSTRACT

A tire for a motorized two wheeled vehicle comprising a reinforcing structure of the carcass type, made up of reinforcing elements, anchored on each side of the tire to a bead the base of which is intended to be mounted on a rim seat, each bead being extended radially outwards by a sidewall, the sidewalls radially towards the outside joining to a tread. The tread comprises at least one incision and in a circumferential plane, at least part of one wall of the at least one incision forms with the radial direction an angle of between 5 and 45°, and the angle formed between at least one part of one wall of the at least one incision and the radial direction in a first circumferential plane is different from the angle formed between at least one part of one wall of the at least one incision and the radial direction in at least one second circumferential plane.

13 Claims, 7 Drawing Sheets

(51) Int. Cl.
  *B60C 11/03* (2006.01)
  *B60C 11/13* (2006.01)

(52) U.S. Cl.
  CPC ......... *B60C11/1218* (2013.04); *B60C 11/1204* (2013.04); *B60C 11/1222* (2013.04); *B60C 11/1236* (2013.04); *B60C 2011/1209* (2013.04); *B60C 2200/10* (2013.04)

(56) References Cited

U.S. PATENT DOCUMENTS

| | | | | |
|---|---|---|---|---|
| 4,683,928 A | * | 8/1987 | Yahagi | 152/209.5 |
| 2003/0205305 A1 | * | 11/2003 | Kuwajima et al. | 152/209.18 |
| 2011/0284141 A1 | * | 11/2011 | Mathews et al. | 152/209.18 |

FOREIGN PATENT DOCUMENTS

| | | | | |
|---|---|---|---|---|
| EP | 0 829 381 | | 3/1998 | |
| EP | 933235 A2 | * | 8/1999 | B60C 11/12 |
| EP | 0 963 864 | | 12/1999 | |
| EP | 1 029 714 | | 8/2000 | |
| EP | 1 987 964 | | 11/2008 | |
| EP | 2 116 395 | | 11/2009 | |
| EP | 2 161 143 | | 3/2010 | |
| FR | 43 383 | | 5/1934 | |
| GB | 2 093 777 | | 9/1982 | |
| JP | 04274902 A | * | 9/1992 | B60C 9/18 |
| JP | 6 106917 | | 4/1994 | |
| JP | 6 183219 | | 7/1994 | |
| JP | 08230416 A | * | 9/1996 | |
| JP | 2000255218 A | * | 9/2000 | B60C 11/12 |
| JP | 2001 039121 | | 2/2001 | |
| WO | WO 2004/018236 | | 3/2004 | |
| WO | WO 2008/149611 | | 12/2008 | |
| WO | WO 2010/000797 | | 1/2010 | |

OTHER PUBLICATIONS

Summary: JP 04274902 A; Kodera, Takeshi; no date.*
Machine Translation: JP 08230416 A; Tanaka, Masatoshi; no date.*

* cited by examiner

TIRE FOR A TWO-WHEELED VEHICLE, COMPRISING A TREAD HAVING SIPES

RELATED APPLICATIONS

This application is a U.S. National Phase Application under 35 USC 371 of International Application PCT/EP2011/051632 filed Feb. 4, 2011.

This application claims the priority of French application No. 10/50989 filed Feb. 12, 2010, the entire content of which is hereby incorporated by reference.

FIELD OF THE INVENTION

The invention relates to a tire intended to be fitted to a vehicle and more particularly intended to be fitted to a two-wheeled vehicle such as a motorbike and, more specifically still, to a tire intended to be fitted to a motorbike with a speed rating higher than W which corresponds to a speed of 270 km/h.

Although not limited to such an application, the invention will be described more particularly with reference to such a motorbike, or motorcycle, tire, and more specifically still with reference to a tire intended to be fitted to the front wheel.

BACKGROUND OF THE INVENTION

As with all other tires, motorbike tires to are going radial, the architecture of such tires comprising a carcass reinforcement made up of one or two layers of reinforcing elements which with the circumferential direction make an angle that may be between 65° and 90°, the said carcass reinforcement being radially surmounted by a crown reinforcement made up of reinforcing elements. However, some non-radial tires do still remain and the invention relates to these also. The invention further relates to tires which are partially radial, which means tires in which the reinforcing elements of the carcass reinforcement are radial over at least part of the said carcass reinforcement, for example in the part corresponding to the crown of the tire.

Numerous crown reinforcement architectures have been proposed, depending on whether the tire is intended to be fitted at the front of the motorbike or fitted at the rear. A first structure, for the said crown reinforcement, consists in using only circumferential cords, and the said structure is more particularly used for rear tires. A second structure, inspired directly by the structures commonly used on passenger vehicle tires, has been used to improve resistance to wear, and involves using at least two working crown layers of reinforcing elements that are substantially parallel to one another within each layer but crossed from one layer to the next, making acute angles with the circumferential direction, such tires being more particularly suitable as front tires for motorbikes. The said two working crown layers may be combined with at least one layer of circumferential elements, generally obtained by helical winding of a strip of at least one rubber-coated reinforcing element.

The choice of tire crown architecture has a direct impact on certain properties of the tire, such as wear, endurance, grip or even drivability or, particularly in the case of motorbikes, stability. However, other tire parameters such as the nature of the rubber compounds of which the tread is made also have an impact on the properties of the said tire. The choice and nature of the rubber compounds of which the tread is made are, for example, essential parameters as far as wear properties are concerned. The choice and nature of the rubber compounds of which the tread is made also have an impact on the grip properties of the tire.

It is also known practice for other types of tire to produce treads comprising incisions, more particularly for tires intended to run on ground covered with snow, black ice, or wetness.

Such treads are usually provided with raised elements of the rib or block type, separated from one another in the circumferential direction and/or in the transverse direction by transverse and/or circumferential grooves. These treads then also comprise incisions or slits, the non-zero widths of which are very much smaller than those of the aforementioned grooves. By making a plurality of cuts that open onto the tread surface, a plurality of rubber edges is created and these cut into the layer of water that may be present on the road surface in order to keep the tire in contact with the ground and create cavities that may potentially form ducts intended to collect the water present in the contact patch via which the tire is in contact with the road and remove it if they are configured in such a way as to open out outside the contact patch.

Numerous types of incision have already been proposed with a view to improving the grip of the tire on the surfaces in question.

Document FR 2 418 719 for example describes incisions which may be normal to the surface of the tread or inclined with respect to the direction perpendicular to the said surface.

Document FR 791 250 describes incisions that run in a wavy pattern along the surface of the tread.

Motorbike performance means that nowadays better control over the handling of the vehicle is desired, notably in the case of certain uses and possibly also the possibility of offering tires for the front wheel that differ according to usage.

As stated previously, the architecture of the crown reinforcement of the tire or indeed the nature of the rubber compounds of the tread may allow such effects to be obtained.

It may also be desirable to build in tire behavior that varies in the axial direction of the tire.

As far as vehicle handling is concerned, the inventors wish to offer motorcyclists more accuracy regarding the feedback felt through the handlebars, either by increasing this feedback or by decreasing it, depending on the use to which the vehicle is being put.

SUMMARY OF THE INVENTION

It is therefore an object of the invention to provide a motorbike tire of which the properties, in terms of handling or handlebar feedback are improved.

This object has been achieved according to one aspect of the invention directed to a tire for a motorized two wheeled vehicle comprising a reinforcing structure of the carcass type, made up of reinforcing elements, anchored on each side of the tire to a bead the base of which is intended to be mounted on a rim seat, each bead being extended radially outwards by a sidewall, the sidewalls radially towards the outside joining to a tread, the tread comprising at least one incision and, in a circumferential plane, at least part of one wall of the said at least one incision forming with the radial direction an angle of between 5 and 45°, and the angle formed between at least one part of one wall of the said at least one incision and the radial direction in a first circumferential plane being different from the angle formed between at least one part of one wall of the said at least one incision and the radial direction in at least one second circumferential plane.

Within the meaning of the invention, an incision is a cut that forms two walls and in which the distance between the walls measured along the normal to a plane tangential to one of the walls is less than 1.5 mm and preferably less than 1 mm. The said distance on the surface of the tread is at least equal to the said distance at the bottom of the incision, which means to say at the point furthest from the surface of the tread. Particularly in the case of a motorbike tire, as the thickness of the tread is relatively small, any widening of the said distance from the surface of the tread towards the bottom of the incision cannot be allowed to exist in case it causes the edges of the incision to collapse at the surface of the tread, thus reducing the area of the contact patch in which the tread makes contact with the ground.

The longitudinal direction of the tire, or the circumferential direction, is the direction corresponding to the periphery of the tire and defined by the direction of running of the tire.

The transverse or axial direction of the tire is parallel to the axis of rotation of the tire.

The axis of rotation of the tire is the axis about which it rotates in normal use.

A circumferential plane or a circumferential plane of section is a plane perpendicular to the axis of rotation of the tire. The equatorial plane is the circumferential plane that passes through the center or crown of the tread.

A radial or meridian plane contains the axis of rotation of the tire.

The radial direction is a direction intersecting the axis of rotation of the tire and perpendicular thereto. The radial direction is the intersection between a circumferential plane and a radial plane.

A tire thus produced according to the invention and mounted on the front wheel of a motorbike effectively gives the rider a different handlebar feedback from the feedback given by a tire that has no incision or indeed one that has incisions but not inclined, which means to say that, in a circumferential plane, no part of a wall of an incision makes with the radial direction an angle of between 5 and 45°. The inventors believe that they have demonstrated that the variable inclination, as proposed by the invention, of the incision with respect to the radial direction in a circumferential plane of section alters the feedback felt through the handlebars, which means to say the reaction of the tire as it becomes the contact patch, and that is felt by the rider.

Advantageously, in order to allow the rider to be sensitive to the feedback felt through the handlebars, in a given circumferential plane, the angle formed between at least one part of one wall of one incision and the radial direction is the same for all the incisions that intersect with the said plane.

That the angle formed between at least one part of one wall of the said at least one incision and the radial direction in a first circumferential plane is different from that formed in at least one second circumferential plane means that, along the curved abscissa of one wall of the said incision, the said angle formed between at least one part of one wall of the incision and the radial direction varies.

According to alternative forms of the invention, this angle may vary continuously or alternatively may be constant along at least part of the curved abscissa.

The variation of the inclination of the incision with respect to the radial direction in a circumferential plane of section of the tire according to the invention along the length of the incision is obtained by combining the choice of the angle formed between at least one part of one wall of the incision in the radial direction, the impact of the orientation of the incision itself with respect to the circumferential direction and the impact of the shape of the tire and notably of the highly curved axial profile.

This variation of the angle along the curved abscissa of one wall of the said incision means that the feedback through the handlebars can be adapted according to the position of the motorbike in terms of camber angle, which means to say according to whether the vehicle is following a straight line or taking a bend.

According to one preferred embodiment of the invention, the said at least one part of one wall of the said at least one incision that forms with the radial direction an angle of between 5 and 45° is in contact with the contact patch. According to this preferred embodiment of the invention, if just part of the wall the incision is inclined, this is the part of the incision that comes into contact with the contact patch.

In point of fact it may be advantageous from an industrial standpoint to limit the inclination of the incision on the part that opens onto the tread and have the part situated more deeply not inclined, in order to limit the forces applied when opening the curing mold after the tire has been vulcanized.

According to other embodiments of the invention, the incision may be inclined over its entire height, or depth. That part of the mold that penetrates the tire in order to form the said incision can then be simpler to produce.

According to other embodiments of the invention, the incision may be inclined over just part of its length; notably when part of the incision is oriented in a direction which is close to the circumferential direction, the incision may advantageously not be inclined.

According to one preferred embodiment of the invention, the difference between the angle formed between at least one part of one wall of the said at least one incision and the radial direction in a first circumferential plane and that formed in a second circumferential plane is greater than 10°.

According to an advantageous alternative form of embodiment of the invention, notably when the main direction on the surface of the tread of the said at least one incision at least locally with the circumferential direction forms an angle greater than 70°, the angle formed between at least one part of one wall of the said at least one incision and the radial direction is less than 30°, in a localized circumferential plane in the region of the incision where this incision makes an angle greater than 70° with the circumferential direction.

The inventors have been able to demonstrate that an angle of inclination of less than 30° has a sufficiently appreciable effect on the feedback through the handlebars as long as the incision makes an angle greater than 70° with the circumferential direction. According to other alternative forms of embodiment of the invention, higher angles of inclination may, however, be envisaged in order to have an even greater effect on feedback through the handlebars.

According to an alternative form of embodiment of the invention, when the main direction on the surface of the tread of the said at least one incision at least locally with the circumferential direction forms an angle smaller than 30°, the angle formed between at least one part of one wall of the said at least one incision and the radial direction is greater than 35° in a localized circumferential plane in the region of the incision where this incision makes an angle smaller than 30° with the circumferential direction.

The inventors have demonstrated that when the incision makes with the circumferential direction an angle smaller than 30°, angles of inclination of the incision greater than 35° are needed in order to have an appreciable effect on feedback through the handlebars.

According to these alternative forms of embodiment it is therefore possible to produce effects on the feedback felt through the handlebars that are more or less consistent using incisions of which the main direction on the surface of the tread varies but by varying the inclination of the said incision along its main direction, the angle formed between at least one part of one wall of the said at least one incision and the radial direction being greater than 35° in a circumferential plane when the main direction on the surface of the tread of the said at least one incision makes with the circumferential direction an angle less than 30° and the angle formed between at least one part of one wall of the said at least one incision and the radial direction being less than 30° in a circumferential plane when the main direction on the surface of the tread of the said at least one incision makes with the circumferential direction an angle greater than 70°.

A first embodiment of the invention has it that the orientation of the angle formed between at least one part of one wall of the said at least one incision and the radial direction is the same as the running direction of the tire.

The inventors have also been able to demonstrate that depending on the various parameters involved in the tire, such an orientation of the inclination of the incision makes it possible either to increase the feedback felt through the handlebars or decrease it. Specifically, depending on the choice of materials from which to make the tread, on the type of reinforcement architecture, whether in terms of the orientation or indeed the nature of the reinforcing elements, on the profile of the tire, notably in its to axial direction, the feedback felt through the handlebars can vary and it may prove advantageous either to increase or to decrease this feedback.

Accordingly, according to another embodiment of the invention, the orientation of the angle formed between at least one part of one wall of the said at least one incision and the radial direction is the opposite of the running direction of the tire.

According to other alternative forms of embodiment of the invention, with the tread consisting of at least one central part and two axially external parts, each of the parts comprises at least one part of one incision and, at the surface of the tread, the orientation of the angle formed between at least one part of one wall of the said at least one part of one incision and the radial direction in the central part is the opposite of the orientation of the angle formed between at least one part of one wall of the said at least one part of one incision and the radial direction in the axially external parts.

According to this alternative form of embodiment of the invention, when the feedback is consistent across the axial width of the tire, it is possible to modify the feedback felt through the handlebars, increasing it and/or decreasing it according to whether the motorcycle is being ridden in a straight line or used canted over at a camber angle. In a straight line, the contact patch corresponds to the central part of the tread, and canted over at a camber angle, the contact patch is shifted in the axial direction towards one or other of the two axially external parts.

The goal will preferably be to increase feedback through the handlebars in the central part of the tread in order notably to reduce handlability at high speeds and to decrease it on the two axially external parts in order on the other hand to improve handlability during cornering.

According to one preferred embodiment of the invention, the difference between the angle formed between at least one part of one wall of the said at least one incision and the radial direction in a first circumferential plane passing through the central part and that formed in a second circumferential plane belonging to an axially external part is greater than 10°.

According to a first alternative form of embodiment of the invention, the smallest angle formed between at least one part of one wall of an incision and the radial direction in a circumferential plane passing through the central region of the central part of the tread of the tire is greater than the largest angle formed between at least one part of one wall of one incision and the radial direction in a circumferential plane passing through the axially outer region of an axially external part of the tread of the tire.

The central part of the tread is axially delimited by the axially outermost points of the contact patch corresponding to running in a straight line. The axially external parts of the tread of the tire correspond to those parts of the tread that are outside the central part.

The central region of the central part is axially delimited on each side of the median plane in a radial plane, on the surface of the tread, by a point that is distant from the median plane of the tire by one quarter of the width of the central part of the tread.

The axially external region of an axially external part of the tread of the tire is axially delimited in a radial plane by a point distant from the axially outermost point of the contact patch contiguous with the axially external part by one quarter of the width of the contact patch of the tread.

The contact path corresponding to running in a straight line is measured by compressing vertically in a direction perpendicular to the axis of rotation of the tire (which means to say that the compressing is done vertically, with the wheel in a vertical plane) the tire mounted on the nominal rim recommended by the ETRTO, inflated to 2.5 bar on an unlubricated plate using a load corresponding to 60% of the load index (the maximum recommended load) of that tire.

According to a second alternative form of embodiment of the invention, the largest angle formed between at least one part of one wall of an incision and the radial direction in a circumferential plane passing through the central region of the central part of the tread of the tire is smaller than the smallest angle formed between at least one part of one wall of one incision and the radial direction in a circumferential plane passing through the axially outer region of an axially external part of the tread of the tire.

One or other of these alternative forms of embodiment may notably be chosen according to the desired level of feedback through the handlebars.

Within the meaning of the invention, according to these alternative forms of embodiment of the invention, the notions of largest angle and smallest angle are considered in terms of absolute value.

As explained earlier, depending on the makeup of the tire but also depending on the use to which it will be put, it is possible to choose an orientation of the angle formed between at least one part of one wall of the said at least one part of one incision and the radial direction in the central part that is in the same direction as the running direction with an opposite angle in the two axially external parts, or alternatively, to offer the opposite configuration.

One advantageous alternative form of the invention has it that the depth of the incisions varies in the axial direction notably in order to take into account the different rates of wear in the axial direction of the tire and obtain tread rigidities that vary in the axial direction.

According to an advantageous alternative form of the invention, at least the surface of the tread consists of a first polymer compound extending over at least one part of the central part and of at least one second polymer compound having physico-chemical properties different from those of the said first polymer compound and covering at least one part of the axially external parts of the tread.

Such an alternative form of embodiment of the invention makes it possible to create a tread which, for example, has improved wear properties in the centre of the tread and improved grip properties on the axially external parts.

As explained earlier, the nature of the polymer compounds of which the tread is made may have an effect on the feedback felt through the handlebars. The presence of different compounds may lead to a desire to increase and/or decrease this feedback according to the use made of the vehicle and notably according to whether it is being ridden in a straight line or around corners. Depending on the nature of the compounds, it may therefore be necessary according to the invention to have angles of inclination of the incisions in the same direction across the entire width of the tread in order to obtain similar or opposite effects, or alternatively to have angles of inclination of the incisions in opposite directions in the central part and in the axially external parts, likewise in order to obtain similar or opposing effects.

According to one advantageous embodiment of the invention, in order to give the tire symmetric properties, the central circumferential band is advantageously centred on the equatorial plane. In other embodiments, intended for example for tires intended to run on a circuit in which all the bends are essentially in the same direction, it is possible for the central circumferential band not to be centered on the equatorial plane.

Advantageous alternative embodiments of the invention may foresee the presence of five or more circumferential bands to form at least the surface of the tread and thus provide a gradual evolution of the properties of the said tread from the equatorial plane out towards the shoulders. As before, such an embodiment may be symmetric with respect to the equatorial plane or non-symmetric, the distribution of the bands differing either in terms of their composition or in terms of their distribution about the equatorial plane.

According to a preferred embodiment of the invention, the second polymer compound is of a composition different from that of the first polymer compound and, more preferably still, the second polymer compound has grip properties superior to those of the said first polymer compound.

According to other embodiments, different properties can be obtained with identical compounds but using different vulcanizing conditions.

Advantageously also, the radial thicknesses of the first and second polymer compounds may differ, so as to optimize tread wear in the axial direction. Advantageously also, the thicknesses vary gradually.

According to one preferred embodiment of the invention, the second polymer compound has a Shore A hardness different from that of the first polymer compound.

The Shore A hardness of the polymer compounds after curing is assessed in accordance with the ASTM D 2240-86 standard.

According to one preferred embodiment of the invention, the reinforcing elements of the carcass-type reinforcing structure make with the circumferential direction an angle of between 65° and 90°.

According to a variant of the invention, the crown reinforcing structure comprises at least one layer of reinforcing elements making with the circumferential direction angles of between 10 and 80°.

According to this alternative form the crown reinforcing structure advantageously comprises at least two layers of reinforcing elements, the reinforcing elements between them making angles of between 20 and 160°, from one layer to the next, preferably angles in excess of 40°.

According to one preferred embodiment of the invention, the reinforcing elements of the working layers are made of textile material.

According to another embodiment of the invention, the reinforcing elements of the working layers are made of metal.

In one advantageous embodiment of the invention, notably with a view to optimizing the rigidities of the reinforcing structure along the median of the tire, and in particular at the edges of the working layers, the angles made by the reinforcing to elements of the working layers with the longitudinal direction can vary in the transverse direction such that the said angle are greater on the axially external edges of the layers of reinforcing elements by comparison with the angles measured at the equatorial plane of the tire.

As explained earlier in the case of different tread polymer compounds, the variations in angle of the reinforcing elements of the working layers may alter the feedback felt through the handlebars in the axial direction.

Such variations in angle of the reinforcing elements of the working layers may lead to a desire to increase and/or decrease the feedback felt through the handlebars according to the use made of the vehicle and notably according to whether it is being ridden in a straight line or around corners. Depending on the nature of the reinforcing elements and on the variations in angle in the axial direction, it may therefore be necessary according to the invention to have the incisions inclined in the same direction across the entire width of the tread in order to obtain similar or opposing effects or alternatively to have the incisions inclined in opposite directions in the central part from in the axially external parts, likewise in order to obtain similar or opposing effects.

One embodiment of the invention has it that the tire notably consists of a crown reinforcing structure which comprises at least one layer of circumferential reinforcing elements; according to the invention, the layer of circumferential reinforcing elements consists of at least one reinforcing element oriented at an angle to the longitudinal direction of less than 5°.

For preference also, the reinforcing elements of the layer of circumferential reinforcing elements are made of metal and/or of textile and/or of glass. The invention notably foresees the use of reinforcing elements of different kinds within one and the same layer of circumferential reinforcing elements.

For preference also, the reinforcing elements of the layer of circumferential reinforcing elements have an elastic modulus higher than 6000 N/mm$^2$.

One alternative embodiment of the invention advantageously has it that the circumferential reinforcing elements are distributed in the transverse direction at a variable pitch.

The variation in the pitch between the circumferential reinforcing elements takes the form of a variation in the number of circumferential reinforcing elements per unit length in the transverse direction and therefore of a variation in the density of circumferential reinforcing elements in the transverse direction and hence of a variation in the circumferential rigidity in the traverse direction.

As explained earlier in the case of different tread polymer compounds and variations in the angle of the reinforcing elements of the working layers, varying the pitch in the axial direction between the circumferential reinforcing elements may alter the feedback felt through the handlebars in the axial direction.

Such variations in the pitch of the circumferential reinforcing elements may lead to a desire to increase and/or decrease the feedback felt through the handlebars according to the use made of the vehicle and notably according to whether it is being ridden in a straight line or around corners. Depending on the nature of the reinforcing elements and on the variations in pitch in the axial direction, it may therefore be necessary according to the invention to have the incisions inclined in the same direction across the entire width of the tread in order to obtain similar or opposing effects or alternatively to have the incisions inclined in opposite directions in the central part from in the axially external parts, likewise in order to obtain similar or opposing effects.

One embodiment of the invention involves combining angles of inclination of the incisions in the same direction across the entire width of the tread or alternatively angles of inclination of the incisions in opposite directions in the central part from in the axially external parts in order to obtain similar or opposing effects with all or quite simply several of the various parameters already mentioned such as different polymer compounds in the central part and in the axially external parts of the tread, angles formed by the reinforcing elements of the working layers with the longitudinal direction that vary in the transverse direction, and varying the pitch in the axial direction between the circumferential reinforcing elements.

BRIEF DESCRIPTION OF THE DRAWINGS

Further details and advantageous features of the invention will become more clearly apparent hereinafter from the description of the embodiments of the invention given with reference to the following drawings.

DETAILED DESCRIPTION OF THE DRAWINGS

In order to make them easier to understand, FIGS. 1 to 4 are not drawn to scale.

Figure 1:
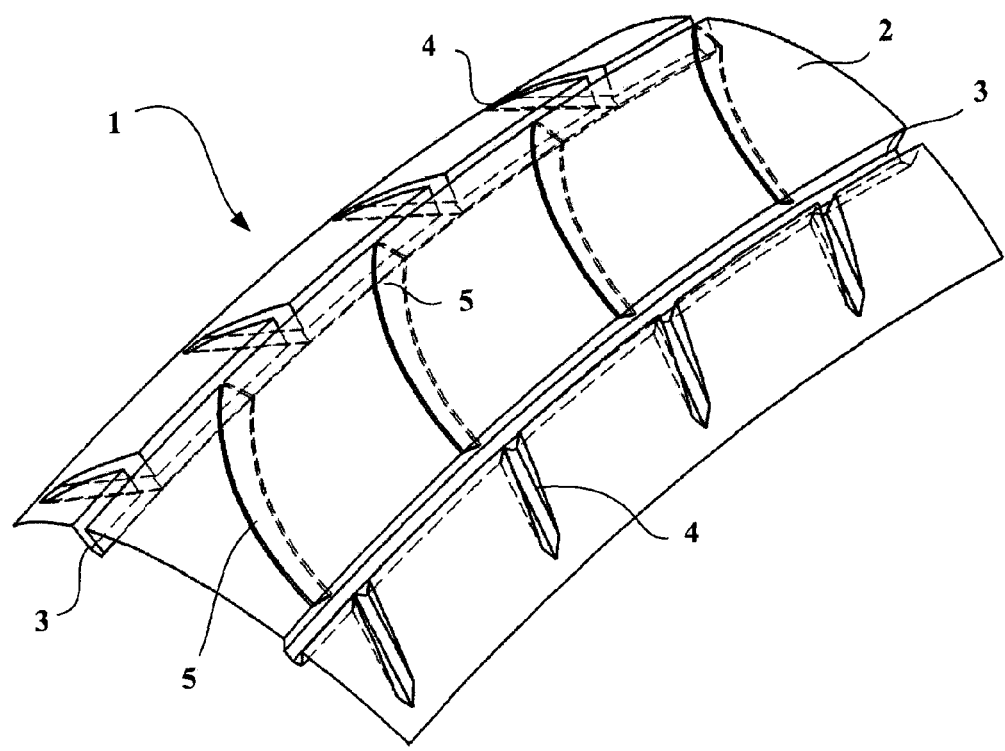
FIG. 1 is a partial perspective view of a diagram of a tire according to a first embodiment of the invention.

FIG. 1 depicts a partial perspective view of a tire 1, and more specifically of the external surface 2 of the tread thereof, intended to be fitted to the front wheel of a motorbike. The tire 1 has a curvature in excess of 0.15 and preferably in excess of 0.3. The curvature is defined by the ratio Ht/Wt, which means the ratio of the height of the tread to the maximum width of the tread of the tire.

In a way which has not been depicted in the figures, the tire 1 comprises a carcass reinforcement consisting of a layer comprising reinforcing elements of textile type. The layer consists of reinforcing elements laid radially. The radial positioning of the reinforcing elements is defined by the angle at which the said reinforcing elements are laid; a radial arrangement corresponds to the said elements being laid with respect to the longitudinal direction of the tire at an angle of between 65° and 90°.

The carcass reinforcement is anchored on each side of the tire 1 in a bead the base of which is intended to be mounted on a rim seat. Each bead is extended radially outwards by a sidewall, the said sidewall radially towards the outside joining to the tread.

The tire 1 further comprises a crown reinforcement consisting for example of two layers of reinforcing elements making angles with the circumferential direction, the said reinforcing elements being crossed from one layer to the next making between them angles for example of 50° in the region of the equatorial plane, the reinforcing elements of each of the layers making an angle of, for example, 25° with the circumferential direction.

The crown reinforcement may even consist of a layer of circumferential reinforcing elements instead of the layers of reinforcing elements that make angles with the circumferential direction or alternatively in combination therewith.

The tread 2 of the tire 1 comprises a tread pattern consisting of circumferentially directed continuous grooves 3 and of transverse grooves 4, the main direction of the latter being at a slight angle to the radial direction in order to give the said tread pattern a direction. This orientation or direction of the tread pattern in the case of a tire fitted to a front wheel is usually such that the sense in which the tread pattern is orientated is the opposite to the sense in which the tire rotates.

According to the invention, the tread has incisions or slits 5, the non-zero widths of which are very much smaller than those of the abovementioned grooves 3 and 4. These incisions according to the invention make in a circumferential plane an angle with the radial direction of between 5 and 45°, about which more later in the description of FIG. 2.

Figure 2:
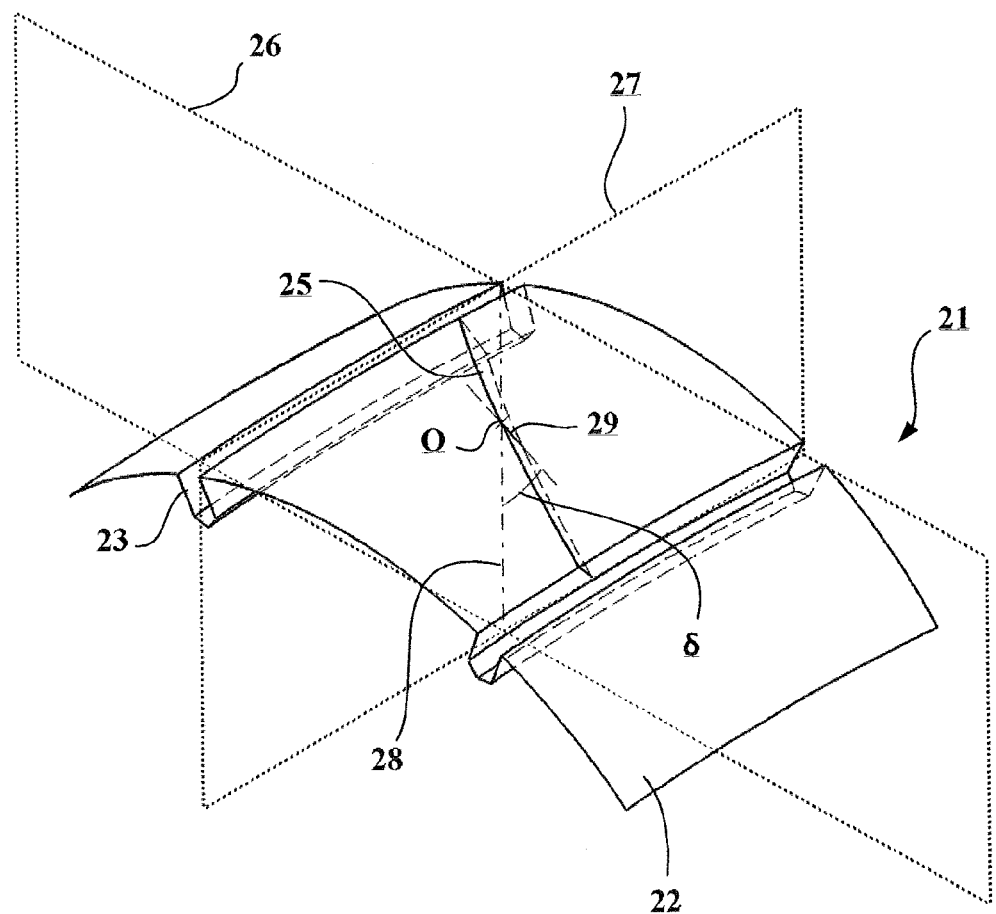
FIG. 2 is a partial perspective view of a diagram of a tire according to a first embodiment of the invention, indicating the magnitude of an angle at one point.

FIG. 2 depicts a partial perspective view of a tire 21 similar to that of FIG. 1 and which differs therefrom by a less detailed depiction of the grooves and the presence of a single incision 25 of which the line on the tread surface 22 forms a curve.

FIG. 2 depicts a meridian plane 26 and the equatorial plane 27 the intersection of which forms a straight line 28 orientated radially and intersecting the incision 25 at a point O on the surface of the tread 22. The tread pattern includes circumferentially directed continuous grooves 23.

The straight line 28 makes at the point O an angle δ with the curve 29 which represents the intersection of the equatorial plane 27 with the incision 25. This angle δ has a magnitude of 34°.

Figure 3A:
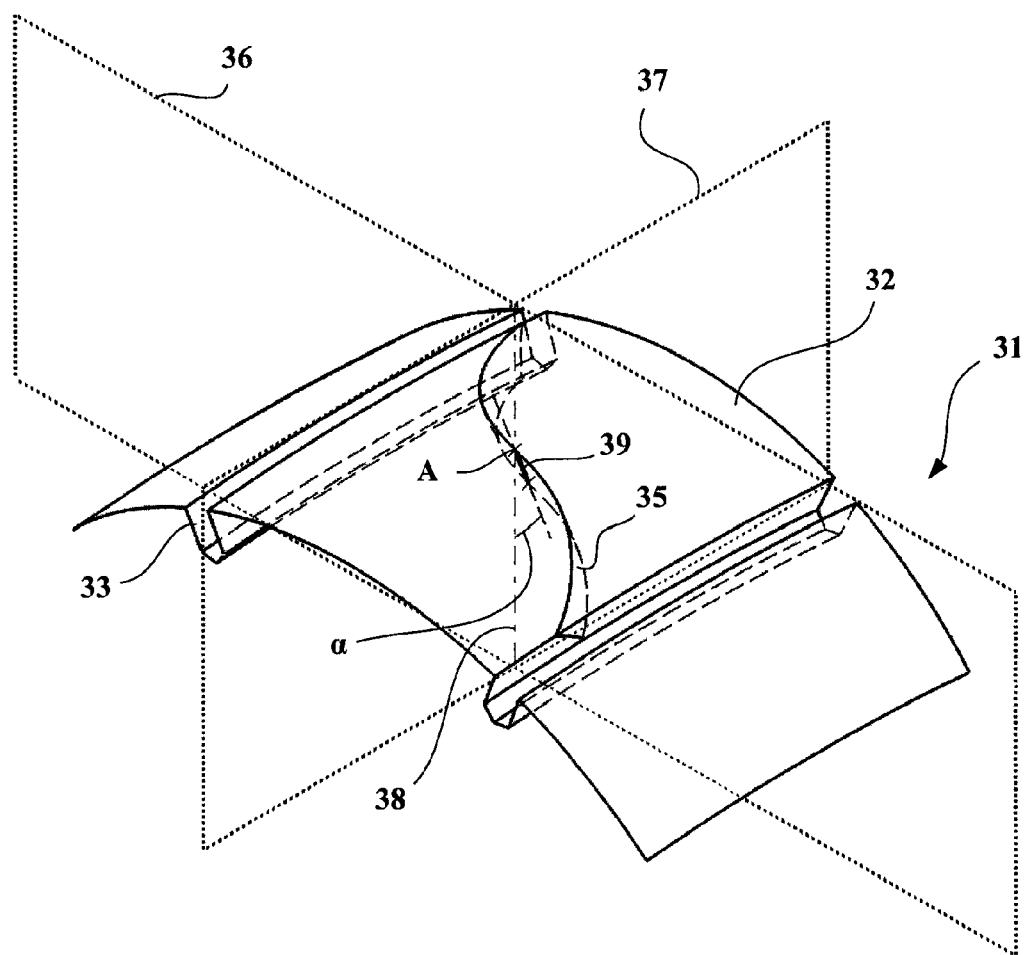
FIG. 3a is a partial perspective view of a diagram of a tire according to a second embodiment of the invention, indicating the magnitude of an angle at one point.
Figure 3B:
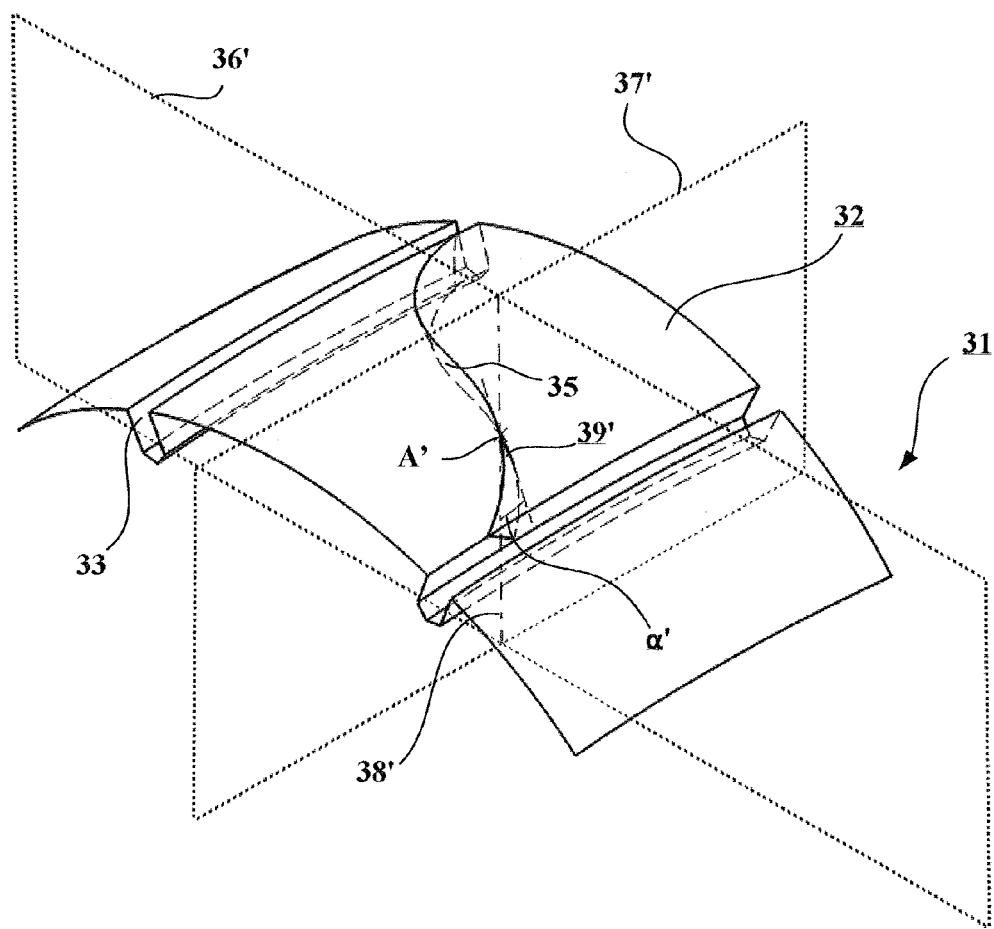
FIG. 3b is a partial perspective view of the diagram of a tire according to the second embodiment of the invention, indicating the magnitude of an angle at a second point.
Figure 3C:
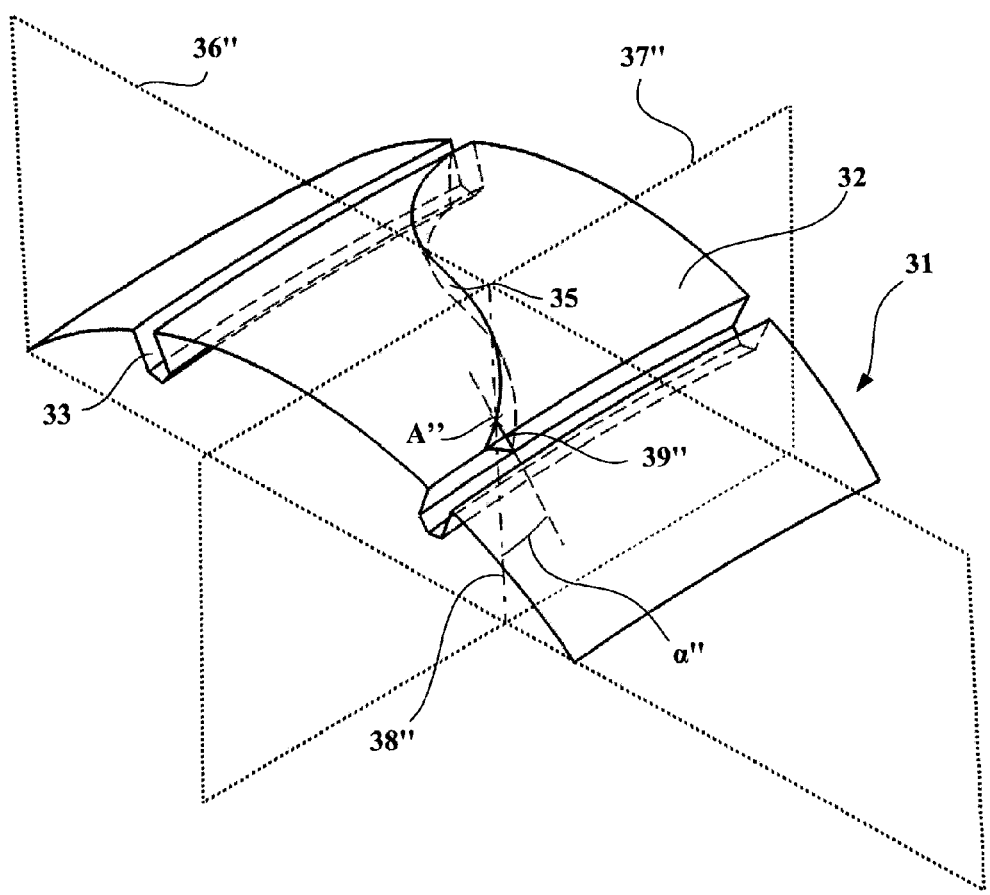
FIG. 3c is a partial perspective view of the diagram of a tire according to the second embodiment of the invention, indicating the magnitude of an angle at a third point.

FIGS. 3a, 3b and 3c depict a partial perspective view of a tire 31 similar to that of FIG. 2, comprising a circumferentially directed continuous grooves 33, and which differs therefrom by the presence of an incision 35 which makes an S-shape on the tread 32.

FIG. 3a depicts a meridian plane 36 and the equatorial plane 37 the intersection of which forms a straight line 38 orientated radially and intersecting the incision 35 at a point A on the surface of the tread 32.

The straight line 38 makes at the point A an angle α with the curve 39 that represents the intersection of the equatorial plane 37 with the incision 35. This angle α has a magnitude of 9°.

FIG. 3b illustrates an angle α' at a point A' between a straight line 38' and a curve 39', the curve 39' being defined as in the case of FIG. 3a but from a different circumferential plane 37' which has been axially translated with respect to the equatorial plane 37 and from a different meridian plane 36' which has been circumferentially translated with respect to the plane 36 of FIG. 3a such that the straight line 38' intersects in the incision 35 at the point A' of the surface of the tread 32. The angle α' has a magnitude of 17°.

FIG. 3c illustrates an angle α" at a point A" between a straight line 38" and a curve 39", the curve 39" being defined as in the case of FIGS. 3a and 3b but from a different circumferential plane 37" which has been axially translated with respect to the equatorial plane 37 and from a different meridian plane 36" which has been circumferentially translated with respect to the planes 36 and 36' of FIGS. 3a and 3b such that the straight line 38" intersects in the incision 35 at the point A" of the surface of the tread 32. The angle α" has a magnitude of 23°.

When designing the mold in which to make the tire 31, a device is provided for creating the incision 35 and this is rotated about an axis in order to create the inclination of the incision within the meaning of the invention. Because of the S-shape of the incision 35 and because of the shape of the tire, notably the axial curvature thereof, this axis of rotation is tangential at just one point of the incision, which means that there is a continuous variation of the angle over the entire length of the incision, as shown by the magnitudes given hereinabove.

Figure 4A:
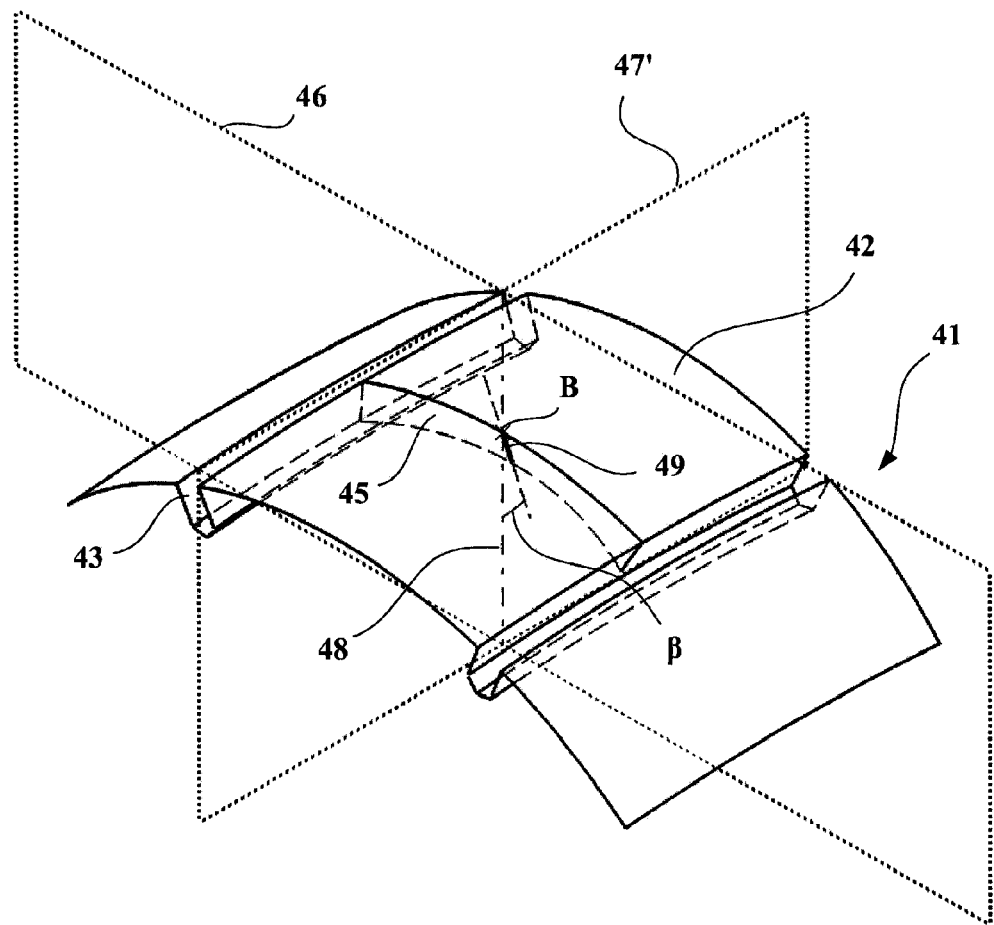
FIG. 4a is a partial perspective view of a diagram of a tire according to a third embodiment of the invention, indicating the magnitude of an angle at a point.
Figure 4B:
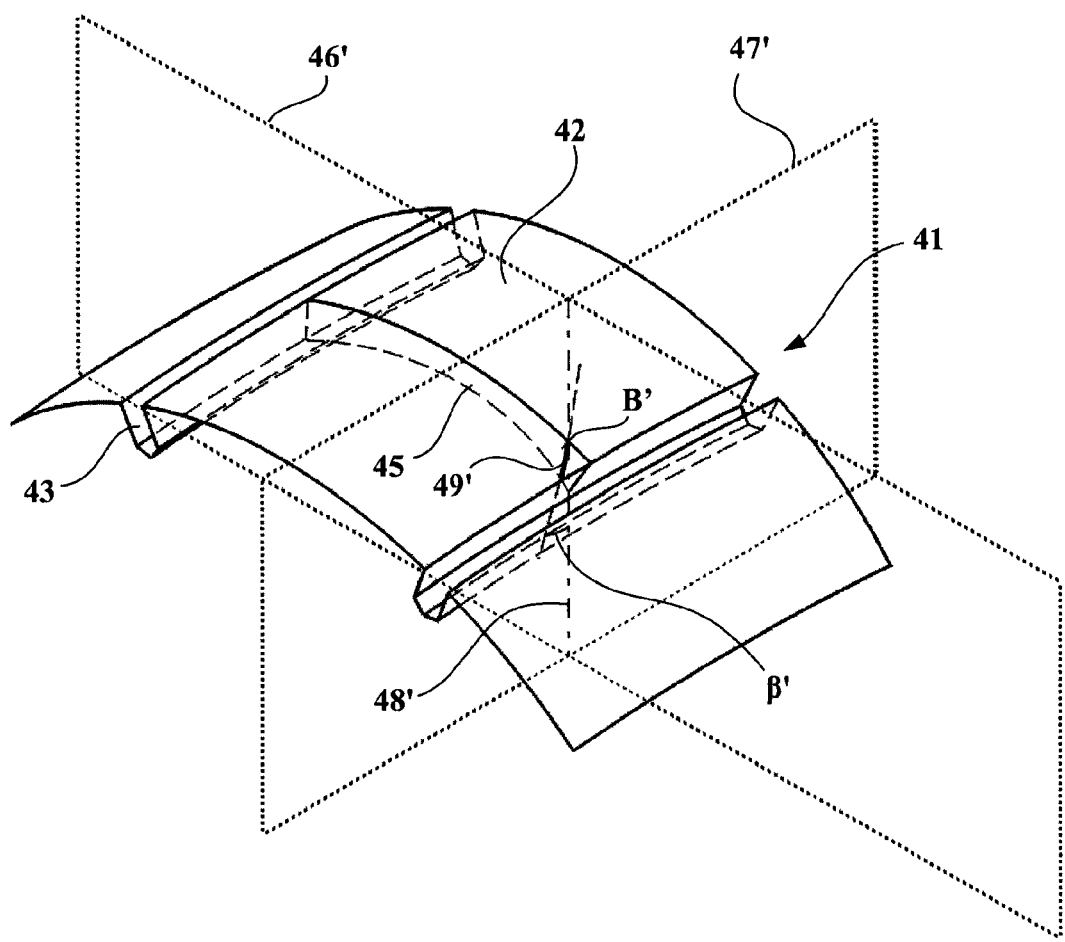
FIG. 4b is a partial perspective view of a diagram of a tire according to the third embodiment of the invention indicating the magnitude of an angle at a second point.

FIGS. 4a and 4b depict a partial perspective view of a tire 41 similar to that of FIGS. 2 and 3, comprising circumferentially directed continuous grooves 43, and which differs therefrom by the presence of a substantially meridian incision 45 the direction of orientation of which varies between the central part of the tire and the axially external parts. The tread pattern includes.

FIG. 4a depicts a meridian plane 46 and the equatorial plane 47 the intersection of which forms a straight line 48 orientated radially and intersecting the incision 45 at a point B on the surface of the tread 42.

The straight line 48 makes at the point B an angle 13 with the curve 49 that represents the intersection of the equatorial plane 47 with the incision 45. This angle β has a magnitude of 10°.

FIG. 4b illustrates an angle β' at a point B' between a straight line 48' and a curve 49', the curve 49' being defined as in the case of FIG. 4a but from a different circumferential plane 47' which has been axially translated with respect to the equatorial plane 47 and from a different meridian plane 46' which has been circumferentially translated with respect to the plane 46 of FIG. 4a such that the straight line 48' intersects the incision 45 at the point B' of the surface of the tread 42. The angle β' has a magnitude of −10°. The negative sign is given to indicate that it is in the opposite direction to the angle β.

According to one of the alternative forms of the invention, one of these angles is orientated in the direction of running of the tire and the other in the opposite direction. These orientations in opposite directions of the inclination of the incision 45 will a priori have opposing effects on the feedback through the handlebars according to whether the rider is riding in a straight line or canted over at a camber angle, provided that the nature of the polymer compounds and the architecture are consistent across the axial width of the tire 41 or, at the very least, across the axial width of the incision 45.

The invention must not be considered to be limited to the description of the examples above. In particular, it envisages combining the various embodiments of the invention illustrated in the figures with polymer compounds for the tread and/or architectures that may vary in the axial direction and notably with tires comprising treads made up of different polymer compounds according to the axial position, layers of circumferentially orientated reinforcing elements the pitch of which varies in the axial direction and angles of the reinforcing elements of the working layers that vary in the axial direction.

The invention must also not be considered to be limited to the case of a tire intended to be fitted to the front wheel of a motorized two-wheeled vehicle as it may also be of benefit for a rear wheel. Specifically, the presence of incisions according to the invention may also have an effect on the wear profile of the tire and, under certain conditions of use, may even have an effect on how the tire behaves when transferring driving or braking torque.

Tests were conducted on a tire of the 120/70 Zr 17 size produced in accordance with the scenario of FIGS. 4a and 4b, a positive angle corresponding to the running direction of the tire.

This tire was compared against two reference tires identical to the tire of the invention except for the complete absence of incisions on the tread of tire R1 and the presence of incisions that were not inclined and were therefore orientated radially, in tire R2. The number of incisions on the tire according to the invention and on reference tire R2 were the same.

The tests involved scoring the tires for handlability, the said tires being mounted on the same motorcycle and ridden by the same rider under the same conditions in order to assess them under acceleration or braking at three different camber angles corresponding respectively to 10°, 20° and 30°.

The results are given in the table below:

|  | Invention | R1 | R2 |
| --- | --- | --- | --- |
| Camber angle 10° | 2 | 3 | 3 |
| Camber angle 20° | 3 | 2.5 | 2.5 |
| Camber angle 30° | 2 | 1.5 | 1.5 |

The results for tire R2 show first of all that the presence of incisions that are not inclined as the invention proposes has no effect on the feedback felt through the handlebars.

The values obtained with the tire according to the invention led to a tire that was easier to handle than reference tires R1 and R2 when the bike was lent over at a high camber angle and which was less easy to handle at smaller camber angles and therefore in a straight line.

The invention claimed is:

1. A tire for a motorized two wheeled vehicle comprising:
a reinforcing structure of a carcass type, made up of reinforcing elements, anchored on each side of the tire to a bead a base of which is intended to be mounted on a rim seat, each bead being extended radially outward by a sidewall, the sidewalls arranged radially toward the outside joining to a tread,
wherein the tread comprises at least one incision, wherein in a circumferential plane, at least part of one wall of said at least one incision forms with the radial direction an angle of between 5 and 45°,
wherein the angle formed between at least one part of one wall of the said at least one incision and the radial direction in a first circumferential plane is different from the angle formed between at least one part of one wall of said at least one incision and the radial direction in at least one second circumferential plane,
wherein the tread comprises a central part and respective axially external parts defined by respective circumferential grooves, wherein the at least one incision traverses the central part and opens into the respective circumferential grooves, and
wherein said tire has a curvature in excess of 0.15, wherein the curvature is defined by a ratio Ht/Wt, where Ht is a height of the tread and Wt is a maximum width of the tread of the tire.

2. The tire according to claim 1, wherein said at least one part of one wall of said at least one incision that forms with the radial direction an angle of between 5 and 45° is in contact with the contact patch.

3. The tire according to claim 1, wherein the difference between the angle formed between at least one part of one wall of said at least one incision and the radial direction in a first circumferential plane and that formed in at least one second circumferential plane is greater than 10°.

4. The tire according to claim 1, wherein said at least one incision at least locally with the circumferential direction forming an angle greater than 70°, wherein the angle formed between at least one part of one wall of said at least one incision and the radial direction is less than 30°.

5. The tire according to claim 1, wherein said at least one incision at least locally with the circumferential direction forming an angle smaller than 30°, wherein the angle formed between at least one part of one wall of said at least one incision and the radial direction is greater than 35°.

6. The tire according to claim 1, wherein the orientation of the angle formed between at least one part of one wall of said at least one incision and the radial direction is the same as the running direction of the tire.

7. The tire according to claim 1, wherein at least the surface of the tread consists of a first polymer compound extending over at least one part of the central part and of at least one second polymer compound having physico chemical properties different from those of said first polymer compound and covering at least one part of the axially external parts of the tread.

8. The tire according to claim 1, wherein the difference between the angle formed between at least one part of one wall of said at least one incision and the radial direction in a first circumferential plane passing through the central part and that formed in a second circumferential plane belonging to an axially external part is greater than 10°.

9. The tire according to claim 1, wherein the reinforcing elements of the carcass type reinforcing structure make with the circumferential direction an angle of between 65° and 90°.

10. The tire according to claim 1, wherein the crown reinforcing structure comprises at least one layer of reinforcing elements, known as the working layer, and wherein the reinforcing elements make with the circumferential direction angles of between 10 and 80°.

11. The tire according to claim 10, wherein the angles made by the reinforcing elements of said at least one working layer with the longitudinal direction can vary in the transverse direction.

12. The tire according to claim 1, wherein the crown reinforcing structure comprises at least one layer of circumferential reinforcing elements.

13. The tire according to claim 12, wherein the circumferential reinforcing elements are distributed in the transverse direction at a variable pitch.

* * * * *